July 14, 1953      R. LEE      2,645,473
GOVERNOR SPEED ADJUSTING APPARATUS
Filed Aug. 30, 1951      2 Sheets-Sheet 2
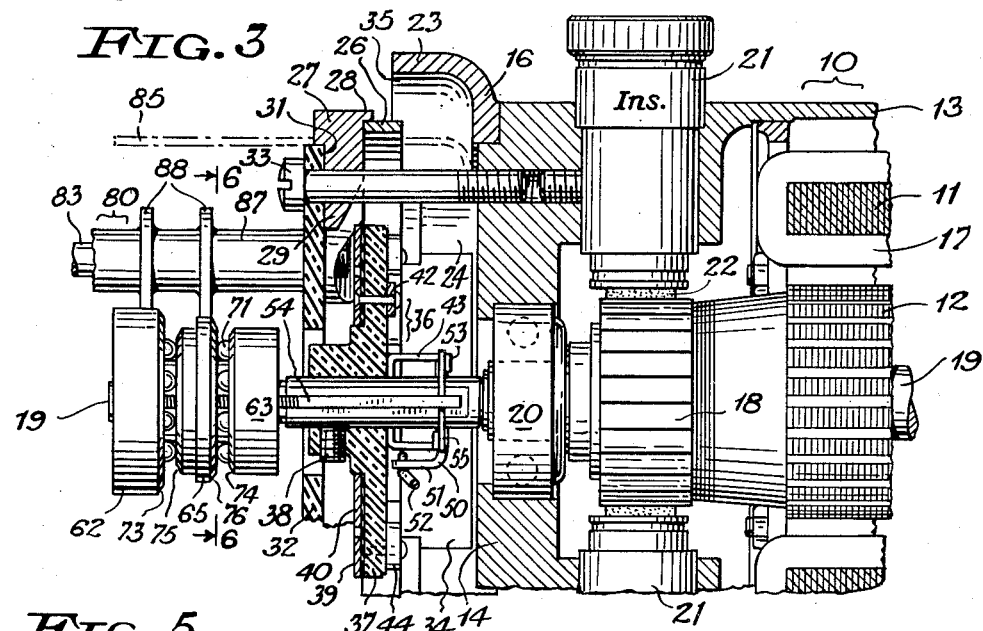
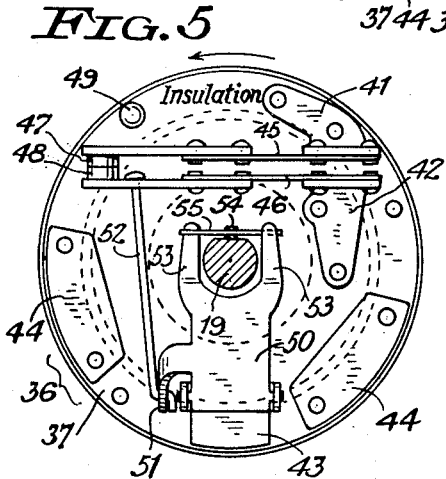
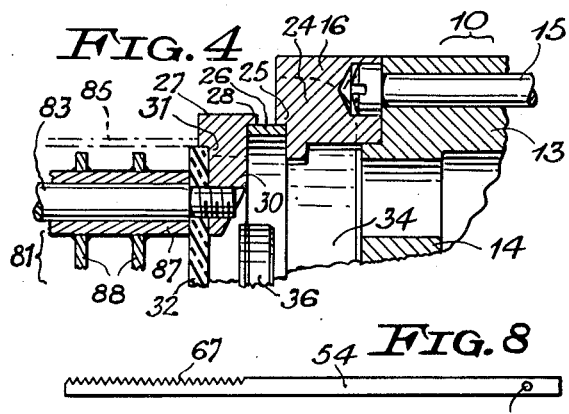
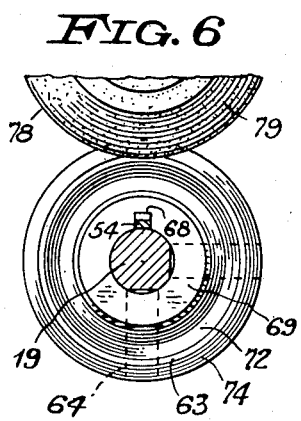
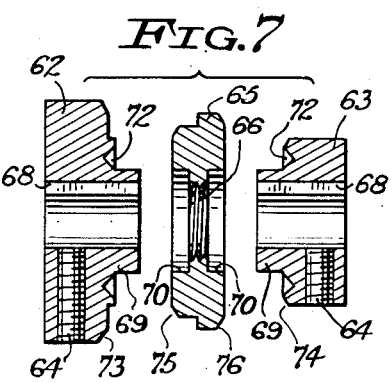
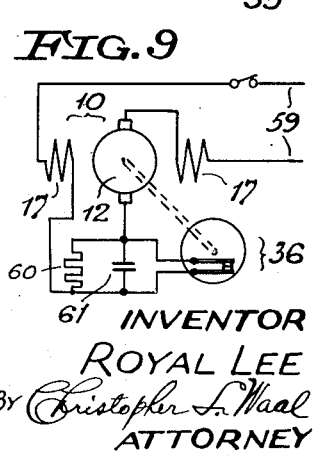
INVENTOR
ROYAL LEE
By Christopher L. Waal
ATTORNEY Patented July 14, 1953

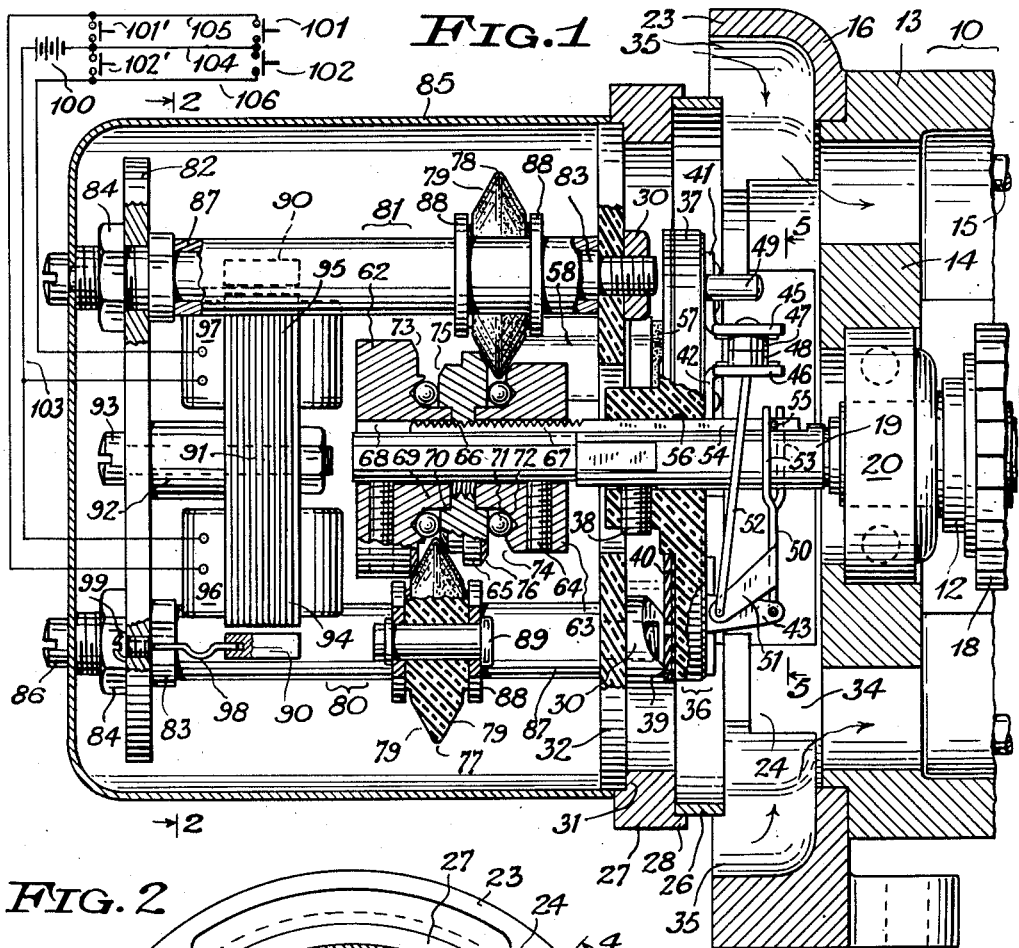

2,645,473

UNITED STATES PATENT OFFICE 2,645,473

GOVERNOR SPEED ADJUSTING APPARATUS

Royal Lee, Elm Grove, Wis., assignor to Lee Engineering Company, Milwaukee, Wis., a corporation of Wisconsin Application August 30, 1951, Serial No. 244,318

11 Claims. (Cl. 264—3)

1

The present invention relates to speed governors, such as for electric motors and other machines, and more particularly to apparatus for changing the speed setting of a governor.

An object of the invention is to provide an improved governor adjusting means which is adapted to be remotely controlled and adapted to effect adjustment of the speed setting while the governor is in operation.

Another object is to provide governor adjusting means in which the actuating power for changing the speed setting is supplied in a simple manner from the governed machine.

A further object is to provide governor adjusting means including an improved form of reversible friction gearing.

A still further object is to perfect details of construction generally.

The invention further consists in the several features hereinafter described and claimed.

In the accompanying drawings,

Fig. 1 is a longitudinal vertical sectional view of a governor-controlled electric motor provided with speed adjusting means of the invention, a control circuit for the adjusting means being shown schematically;

Fig. 2 is a transverse sectional view taken generally on the line 2—2 of Fig. 1;

Fig. 3 is a fragmentary longitudinal sectional view of the motor, taken generally on the line 3—3 of Fig. 2;

Fig. 4 is a detail sectional view taken generally on the line 4—4 of Fig. 2;

Fig. 5 is a sectional view taken generally on the line 5—5 of Fig. 1 and showing a centrifugal governor switch for the motor;

Fig. 6 is a detail sectional view taken generally on the line 6—6 of Fig. 3;

Fig. 7 is an exploded sectional view of a set of friction wheels for the speed adjusting means;

Fig. 8 is a detail view of an actuating rack, and

Fig. 9 is a diagrammatic view of a governor circuit.

In the drawings, 10 designates an electric motor having a stator or field core 11 and a rotor or armature 12, Fig. 3. The stator and rotor are mounted in a housing member 13, Figs. 1 and 3, which is provided with an apertured end wall 14 and assembly screws 15 and is secured to and supported by an end bell member 16. One end portion of the motor is illustrated, the rest of the motor being of any conventional construction. The stator 11 has one or more field windings 17, and the rotor or armature 12 has a commutator 17 and is carried on a rotatably supported shaft 19, the shaft bearings including a ball bearing 20 mounted in the end wall 14 of the housing member. The housing member mounts diametrically opposite radial brush holders 21 carrying brushes 22 which bear on the commutator 18. By way of example, the motor

2 may be of the series of universal type, and the motor stator may be generally similar in construction to that disclosed in my United States Patent 2,406,389 for Electric Motor, issued August 27, 1946.

The end bell member 16 includes a guard-forming peripheral portion 23 with a plurality of inwardly projecting radial lugs 24 having shoulders 25, Fig. 4. A cylindrical ring member 26 coaxial with the motor shaft is spaced inwardly from the periphery of the end bell member and has an edge portion abutting axially against the lugs 24 and centered by the lug shoulders 25, Fig. 4. An annular aligning plate 27 axially engages the other edge of the ring member 26 and has an annular centering bead 28 surrounding the ring member. The aligning plate is provided with pairs of inwardly projecting apertured lugs 29 and 30 and at its outer face has an annular recess or rabbet 31 to position a centrally apertured insulating disk or plate 32. The disk 32, plate 27, ring member 26, and end bell member 16 are clamped together and secured to the motor housing member 13 by screws 33, Figs. 2 and 3, extending parallel to the motor shaft and tapped into the housing member, the screws passing through the aligning plate lugs 29. A governor chamber 34 is formed between the disk 32 and the end wall 14 of the housing member, the chamber having arcuate air intake slots 35 formed between the ring member 26 and the peripheral portion 23 of the end bell member.

An end portion of the motor shaft 19 projects from the shaft bearing 20 through the chamber 34 and beyond the insulated disk 32. The shaft carries thereon a speed governor 36 for regulating the speed of the motor, the governor being shown in the form of a centrifugal switch. Except for speed setting or adjusting means hereinafter described, the governor 36 is generally similar to that disclosed in my United States Patent 1,767,146, for Variable-Speed Electric-Motor Switch, issued June 24, 1930. The governor comprises a hubbed insulating rotor disk 37 rigidly secured to the motor shaft, as by one or more set screws 38, and having secured thereto at one face a pair of flat, concentric collector rings 39 and 40 and at the other face three brackets 41, 42, and 43, and balancing plates 44. The brackets 41 and 42, which are electrically connected to the respective collector rings 39 and 40, as by riveting, have respectively secured thereto a pair of substantially parallel spring arms or reeds 45 and 46 which are arranged tangentially at one side of the rotor axis. The free end portions of the spring arms 45 and 46 carry cooperating contacts 47 and 48, Fig. 5. The outer spring arm 45 is urged outwardly by centrifugal force to separate the contacts, the maximum deflection of this spring arm being limited by a stop pin 49 secured to the rotor disk. The bracket 43 is mounted on the rotor disk at the opposite side of the shaft axis from the spring arms and pivotally carries a bell-crank lever 50 which is swingable on an axis at right angles to the shaft. The lever 50 includes an arm 51 which is connected by a link 52 to the inner spring arm 46 for varying the position of this spring arm, this position determining the speed of rotation at which the contacts will separate. Another arm of the bell-crank lever 50 has spaced fingers 53 forming a fork which straddles the motor shaft and is movable in a direction approximately parallel to the motor shaft, the fingers being slightly offset with respect to each other in this direction. An adjusting or actuating rack 54 of square cross-section extends longitudinally of the motor-shaft and has a cross pin 55 at its inner end engaging the fingers 53 of the bell-crank lever. The rack 54 is slidably guided in a slot or keyway 56 formed in the governor disk hub and is reciprocable along the shaft, as hereinafter described, to vary the position of the contact-carrying spring arm 46 and thereby adjust the speed setting of the governor. Electric current is conducted to the slip rings 39 and 40 of the governor disk by brushes 57 carried in brush holders 58 which are mounted on the stationary insulating disk or plate 32. The governor switch is included in a suitable speed regulating circuit, one form of which is shown by way of example in Fig. 9. In this circuit, the armature 12 is connected between the series field winding 17, and the other terminals of the field windings are connected to line conductors 59. The governor switch is connected in series with the motor windings, as between the armature and one of the field windings. Preferably, the governor switch is shunted by a resistor 60 and a capacitor 61.

Axially spaced driving friction wheels 62 and 63 are rigidly secured to the free end portion of the motor shaft at a region beyond the disk 32, as by set screws 64, and between these wheels is rotatably mounted and axially confined a driven friction wheel 65. The driven wheel 65, which forms a nut, has a screw-threaded axial bore 66 the teeth of which mesh with teeth 67 on the rack 54. The driving wheels have aligned slots or keyways 68 which slidably guide the rack, and further have confronting hub portions 69 which loosely fit in counterbores 70 formed in the opposite sides of the driven wheel so as to rotatably support the driven wheel. Thrust balls 71 are placed between the driven wheel and each driving wheel and are rollable in grooves 72 formed in the driving wheels.

The driving wheels 62 and 63 have respective beveled or frusto-conical friction zones or bands 73 and 74 at the sides adjacent to the driven wheel 65, and the driven wheel has beveled friction zones or bands 75 and 76 at opposite sides. The beveled friction band 73 of the driving wheel 62 is of larger effective diameter than the adjacent friction band 75 of the driven wheel, and the friction band 74 of the driving wheel 63 is of smaller effective diameter than the adjacent friction band 76 of the driven wheel.

A pair of selectively operable idler wheels 77 and 78, such as of Bakelite, are mounted as hereinafter described to turn on axes substantially parallel to the motor shaft, and have opposite beveled friction surfaces 79. The idler wheel 77 is rotatably carried on a rocker bracket 80 and is adapted to be wedged between the driving wheel 62 and the driven wheel 65 into engagement with the friction bands 73 and 75. The idler wheel 78 is rotatably carried by a rocker bracket 81 and is adapted to be wedged between the driving wheel 63 and the driven wheel into engagement with the friction bands 74 and 76. Each driving wheel, the cooperating idler wheel, and the driven wheel form a train of differential friction gearing. The engagement of the idler wheel 77 with the friction bands 73 and 75 serves to rotate the driven wheel slightly faster than the motor shaft so as to shift the actuating rack 54 in one direction, and the engagement of the idler wheel 78 with the friction bands 74 and 76 serves to rotate the driven wheel slightly slower than the motor shaft so as to shift the actuating rack in the opposite direction. The outward travel of the rack, effected for example by the idler wheel 77, displaces the governor spring arm 46 inwardly to lower the shaft speed at which the governor contacts will separate, and the inward travel of the rack, effected by the other idler wheel, causes or permits outward displacement of this spring arm to raise the shaft speed at which the contacts will separate.

A disk or plate 82 is spaced axially from the governor brush mounting disk 32 and is secured thereto and to the aligning ring 27 by a pair of shoulder studs 83 arranged at opposite sides of the motor shaft and extending parallel to the shaft. The inner ends of the studs are threaded into the lugs 30 of the aligning plate, and the outer ends are clamped to the disk 82 by nuts 84. A cup-shaped sheet metal casing 85 surrounds the disk assembly and is secured by screws 86 threaded into the outer ends of the studs 83, the inner end of the casing being positioned by the periphery of the insulating disk 32.

Each of the idler wheel rocker brackets 80 and 81 comprises a tubular shaft 87 having a pair of spaced wheel-supporting arms 88 with a pivot pin 89 for the corresponding idler wheel, the wheel being axially confined between the arms. The tubular shafts are rockably mounted on the respective studs 83 between the spaced disks 32 and 82, and each shaft carries near its outer end a radial arm or blade 90 forming a magnetizable armature. A laminated core 91 of magnetic material is secured to the disk 82, as by screws 93 and spacers 92, and is provided with two sets of oppositely directed parallel core legs 94 and 95 to cooperate with the armatures 90 of the respective rocker brackets 80 and 81, there being three core legs in each set, and the corresponding armature being adjacent to the polar ends of the legs. Windings 96 and 97 surround the opposite center legs of the core, thus forming a pair of electromagnets for actuating the respective rocker brackets 80 and 81. The windings 96 and 97 are adapted to be energized selectively, as hereinafter described, for selectively attracting the rocker bracket armatures 90 and thereby selectively engaging the idler wheels 77 and 78 with the shaft friction wheels to adjust the governor speed setting. The rocker brackets are yieldably retained in normal position, as by spring fingers 98 which are secured to screws 99 threaded into the disk 82 and which have their free ends engaging the armatures 90. In the normal position of the rocker brackets, the idler wheels are slightly spaced from the shaft wheels.

As seen in Fig. 1, the magnet windings 96 and 97 are connected in a suitable control circuit including a source of current 100 and selectively operable push-button switches 101 and 102. A conductor 103 connects terminals of the windings with a terminal of the current source, and a conductor 104 connects the other terminal of the current source with terminals of the push-button switches. The other terminals of the windings 96 and 97 are connected to the push-button switches 101 and 102 by respective conductors 105 and 106. The switches 101 and 102 may be placed at a distance from the motor. In some instances, additional push-button switches 101' and 102' may be connected in parallel with the switches 101 and 102, and placed at different locations, either remote from the motor or near the motor, thus permitting the motor speed to be adjusted at different stations. The control windings may be energized by either direct current or alternating current.

In the operation of the motor, the governor contacts 47 and 48 separate when the motor accelerates to a predetermined speed dependent on the position of the spring arm 46, thus limiting the motor current and further rise in motor speed. The motor speed then falls slightly, causing the governor contacts to reclose and thereby slightly increase the motor speed, and the cycle of operation is repeated. In practice, the contacts open and close at a relatively high frequency, for example 50 to 500 cycles per second, maintaining the motor speed within close limits. When the speed setting is to be changed, the operator closes one or the other of the push-button switches 101 and 102 (or 101' and 102'), thus selectively energizing the magnet windings 96 and 97 and effecting selective engagement of the idler wheels 77 and 78 with the corresponding friction bands of the shaft wheels. The friction wheel 65 is thus driven at a greater or less speed than the motor shaft by the differential gearing, causing axial movement of the actuating rack 54 in one direction or the other so as to swing the bell-crank lever 50 in one direction or the other for changing the position of the spring arm 46. When this spring arm is shifted toward the motor shaft axis the motor speed is reduced, and when the arm is shifted outwardly the motor speed is increased. As soon as the desired motor speed is reached the operator releases the push-button switch, thus releasing the pressure of the corresponding idler wheel on the shaft wheels. The nut-forming friction wheel 65 then rotates synchronously with the motor shaft so as to maintain the selected speed setting.

What I claim as new and desire to secure by Letter Patent is:

1. The combination of a power-rotated shaft, an adjustable speed governor driven by said shaft, a reciprocable governor adjusting member rotatable with said shaft and shiftable axially thereof in opposite directions, said adjusting member having an operative connection with said governor to increase the speed setting of the governor when said member is shifted in one direction and to reduce the speed setting of the governor when said member is shifted in the other direction, and selectively operable trains of friction gearing driven by said shaft for selectively shifting said governor adjusting member in opposite directions, said gearing including a driven wheel coaxially carried by said shaft and having a screw-threaded engagement with said axially shiftable member.

2. The combination of a power-rotated shaft, an adjustable speed governor driven by said shaft, a reciprocable governor adjusting member rotatable with said shaft and shiftable axially thereof in opposite directions, said adjusting member having an operative connection with said governor to increase the speed setting of the governor when said member is shifted in one direction and to reduce the speed setting of the governor when said member is shifted in the other direction, and selectively operable trains of friction gearing driven by said shaft for selectively shifting said governor adjusting member in opposite directions, said friction gearing including driving and driven wheels carried by said shaft and idler wheels releasably engageable with said shaft-carried wheels.

3. The combination of a power-rotated shaft, an adjustable governor driven by said shaft, a governor adjusting member rotatable with and shiftable axially of said shaft and having an operative connection with said governor to increase the speed setting of the governor when said member is shifted in one direction and to reduce the speed setting of the governor when said member is shifted in the other direction, an internally screw-threaded wheel carried by said shaft and normally rotatable synchronously therewith but also being relatively rotatable in both directions with respect to said shaft, said wheel having a threaded engagement with said adjusting member for shifting said member in either direction, and selectively operable trains of control gearing driven by said shaft for driving said wheel in either direction.

4. The combination of a power-rotated shaft, an adjustable governor driven by said shaft, a reciprocable governor adjusting member extending longitudinally of said shaft and rotatable with said shaft, said member being shiftable axially of said shaft and having an operative connection with said governor to increase the speed setting of the governor when said member is shifted in one direction and to reduce the speed setting of the governor when said member is shifted in the other direction, a pair of first and second friction wheels fixed on said shaft and having annular friction surfaces, a third friction wheel confined between said first-named wheels and having a screw-threaded engagement with said adjusting member, said third wheel normally rotating synchronously with said first and second wheels but being mounted for relative rotation with respect to said first-named wheels, said third friction wheel having a pair of annular friction surfaces one of which is of smaller effective diameter than the friction surface on said first wheel and the other of which is of larger effective diameter than the friction surfaces on the second wheel, a first idler wheel engageable with the associated friction surfaces of said first and third wheels for driving said third shaft wheel at a speed higher than the shaft speed to shift said adjusting member in one direction, a second idler wheel engageable with the associated friction surfaces of said second and third wheels for driving said third wheel at a speed slower than the shaft speed to shift said adjusting member in the other direction, and means for selectively engaging said idler wheels with the associated shaft wheels.

5. The combination of a power-rotated shaft, an adjustable speed governor driven by said shaft, a reciprocable governor adjusting member rotatable with said shaft and shiftable axially thereof in opposite directions, said adjusting member having an operative connection with said governor to increase the speed setting of the governor when said member is shifted in one direction and to reduce the speed setting of the governor when said member is shifted in the other direction, selectively operable trains of control gearing driven by said shaft for selectively shifting said governor adjusting member in opposite directions, said control gearing including driving and driven wheels carried by said shaft and selectively engageable idler wheels, movably mounted supporting means for said idler wheels, and electromagnetic means for shifting said supporting means to effect selective engagement of said idler wheels.

6. The combination of a power-rotated shaft, an adjustable speed governor driven by said shaft, a reciprocable governor adjusting member rotatable with said shaft and shiftable axially thereof in opposite directions, said adjusting member having an operative connection with said governor to increase the speed setting of the governor when said member is shifted in one direction and to reduce the speed setting of the governor when said member is shifted in the other direction, selectively operable trains of control gearing driven by said shaft for selectively shifting said governor adjusting member in opposite directions, said control gearing including driving and driven wheels carried by said shaft and a pair of selectively engageable idler wheels, pivotally mounted supporting members for said idler wheels, and selective magnetic means for displacing said supporting members to effect selective engagement of said idler wheels.

7. The combination of a power-rotated shaft, an adjustable speed governor driven by said shaft, a reciprocable governor adjusting member rotatable with said shaft and shiftable axially thereof in opposite directions, said adjusting member having an operative connection with said governor to increase the speed setting of the governor when said member is shifted in one direction and to reduce the speed setting of the governor when said member is shifted in the other direction, a pair of first and second friction wheels fixed on said shaft to rotate therewith, a third friction wheel interposed between said first-named wheels and having a screw-threaded engagement with said adjusting member, said third wheel normally rotating synchronously with said first and second wheels but being mounted for relative rotation with respect to said first-named wheels, a first idler wheel frictionally engageable with said first and third wheels in differential driving engagement therewith for rotating said third wheel with respect to said shaft in a sense effecting axial shifting of said adjusting member in one direction, a second idler wheel frictionally engageable with said second and third wheels in differential driving engagement therewith for rotating said third wheel with respect to said shaft in a sense effecting axial shifting of said adjusting member in the other direction, and means for selectively engaging said idler wheels with the associated shaft wheels.

8. The combination of an electric motor having a rotatable shaft, an adjustable motor speed governor driven by said shaft, speed adjusting means for said governor including a reciprocable actuator rotatable with and shiftable axially of said shaft, and operating means for said actuator including selectively operable trains of control gearing driven by said shaft for selectively shifting said actuator in opposite directions, said gearing including a driven wheel coaxially carried by said shaft and having a screw-threaded engagement with said axially shiftable actuator.

9. The combination of a power-rotated shaft, an adjustable speed governor driven by said shaft, a reciprocable governor adjusting member rotatable with said shaft and shiftable axially thereof in opposite directions, said adjusting member having an operative connection with said governor to increase the speed setting of the governor when said member is shifted in one direction and to reduce the speed setting of the governor when said member is shifted in the other direction, selectively operable trains of control gearing driven by said shaft for selectively shifting said governor adjusting member in opposite directions, said control gearing including driving and driven wheels carried by said shaft and a pair of selectively operable idler wheels, one of said idler wheels being engageable with said driven wheel and one of said driving wheels in differential driving relation thereto for rotating said driven wheel faster than said shaft, and the other idler wheel being engageable with said driven wheel and the other driving wheels in differential driving relation thereto for rotating said driven wheel slower than said shaft.

10. The combination of a power-rotated shaft, an adjustable speed governor driven by said shaft, a reciprocable governor adjusting member rotatable with said shaft and shiftable axially thereof in opposite directions, said adjusting member having an operative connection with said governor to increase the speed setting of the governor when said member is shifted in one direction and to reduce the speed setting of the governor when said member is shifted in the other direction, selectively operable trains of control gearing driven by said shaft for selectively shifting said governor adjusting member in opposite directions, said control gearing including driving and driven wheels carried by said shaft and selectively operable idler wheels cooperating with said shaft wheels, a pair of spaced stationary supports, connecting means extending between said supports, supporting means for said idler wheels pivotally carried by said connecting means, and electromagnetic means carried by one of said supports for effecting selective operation of said idler wheels.

11. The combination of a power-rotated shaft, an adjustable speed governor driven by said shaft, a reciprocable governor adjusting member rotatable with said shaft and shiftable axially thereof in opposite directions, said adjusting member having an operative connection with said governor to increase the speed setting of the governor when said member is shifted in one direction and to reduce the speed setting of the governor when said member is shifted in the other direction, and selectively operable trains of friction gearing driven by said shaft for selectively shifting said governor adjusting member in opposite directions, said friction gearing including driving and driven wheels carried by said shaft and selectively engageable idler wheels normally out of contact with the shaft wheels, each idler wheel having opposite beveled friction surfaces adapted to contact with the associated shaft wheels and forming therewith a differential drive.

ROYAL LEE.

References Cited in the file of this patent

UNITED STATES PATENTS

| Number | Name | Date |
|---|---|---|
| 1,750,361 | Rothermel et al. | Mar. 11, 1930 |
| 2,261,145 | Dickey | Nov. 4, 1941 |
| 2,299,635 | MacNeil et al. | Oct. 20, 1942 |
| 2,390,144 | Gossling | Dec. 4, 1945 |